United States Patent
Kato et al.

(10) Patent No.: US 6,266,230 B1
(45) Date of Patent: Jul. 24, 2001

(54) MULTILAYER CERAMIC CAPACITOR

(75) Inventors: Junichi Kato; Takuya Ishii; Koji Yoshida; Tsutomu Nishimura; Yoshimasa Yabu, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/339,521

(22) Filed: Jun. 24, 1999

(30) Foreign Application Priority Data

Jun. 29, 1998 (JP) .................................................. 10-182124

(51) Int. Cl.$^7$ ...................................................... H01G 4/06
(52) U.S. Cl. .................................... 361/321.2; 361/321.2; 361/306.1; 361/312; 501/135; 501/136; 501/137
(58) Field of Search .............................. 361/306.1, 321.1, 361/321.5, 301.4, 312, 313, 252; 501/136, 135, 137

(56) References Cited

U.S. PATENT DOCUMENTS

| | | | |
|---|---|---|---|
| 4,788,634 | * | 11/1988 | Schlecht et al. ......................... 363/21 |
| 4,859,641 | * | 8/1989 | Fujino et al. ........................... 501/136 |
| 5,065,274 | * | 11/1991 | Berghout et al. ...................... 361/321 |
| 5,164,882 | * | 11/1992 | Kanai et al. ........................... 361/321 |
| 5,275,988 | * | 1/1994 | Mori et al. ............................. 501/136 |
| 5,852,542 | * | 12/1998 | Wada et al. .......................... 361/321.5 |
| 6,001,683 | * | 1/2000 | Dat ....................................... 361/306.1 |

FOREIGN PATENT DOCUMENTS

| | | |
|---|---|---|
| 52-4440 | 11/1977 | (JP) . |
| 53-29037 | 8/1978 | (JP) . |
| 53-36160 | 9/1978 | (JP) . |
| 60-189107 | 9/1985 | (JP) . |
| 63-34802 | 2/1988 | (JP) . |

OTHER PUBLICATIONS

S. Nishigaki et al. "Dielectric Properties of Ceramics in the System $(Sr_{0.50}Pb_{0.25}Ca_{0.25})$ $TiO_3$—$Bi_2O_3 \cdot 3TiO_2$ and Their Applications in a High—Voltage Capacitor" *Journal of the American Ceramic Society,* vol. 65, No. 11, pp. 554–560.

H. Yamamoto et al. "Material Development of High Dielectric Constant (Sr, Pn)$TiO_3$ Series Ceramics" *Nippon Seramikkusu Kyokai Gakujutsu Ronbunshi,* vol. 97, pp. 619–622.

* cited by examiner

*Primary Examiner*—Anthony Dinkins
*Assistant Examiner*—Nguyen Ha
(74) *Attorney, Agent, or Firm*—Merchant & Gould P.C.

(57) ABSTRACT

The present invention provides a multilayer ceramic capacitor in which electrode metal layers and dielectric ceramic layers are laminated alternately and its dielectric constant peak is present at a temperature below –50° C. The multilayer ceramic capacitor is at least one selected from a multilayer ceramic capacitor to be incorporated into an electric circuit in which an electric field of at least 200 V/mm is applied to dielectric layers as a DC bias electric field and an alternating current at a frequency of at least 20 kHz is superimposed and a multilayer ceramic capacitor to be incorporated into an electric circuit in which an electric field of at least 200 V/mm is applied to dielectric layers as an AC electric field. As the dielectric ceramic, a ceramic containing lead atoms whose amount is indicated by being measured in the form of PbO, which is at least 30 mol %, particularly a compound with a perovskite structure represented by $ABO_3$ is used. Thus, an inexpensive large-capacity multilayer capacitor that has thermal resistance and is stable for a high DC bias voltage and a high frequency voltage, and a low loss switching power supply using this capacitor can be provided.

12 Claims, 5 Drawing Sheets

MULTILAYER CERAMIC CAPACITOR

FIELD OF THE INVENTION

The present invention relates to a multilayer ceramic capacitor. More particularly, the present invention relates to a multilayer ceramic capacitor used in a switching power supply or the like and to a power-supply unit such as a switching power supply and a device for generating high voltages using the multilayer ceramic capacitor.

BACKGROUND OF THE INVENTION

With miniaturization of electronic equipment, a switching power supply has been reduced in size more and more. The switching power supply can be miniaturized by reducing the size of devices used therein and mounting them with high density. However, a temperature increase due to the losses that occur in respective devices cannot be avoided. Therefore, each device must be a low-loss device and must have thermal resistance. Further, a capacitor applied to a switching power supply is used under severe conditions not only in a thermal environment but also in an electric environment. In other words, a high DC bias voltage or a large-amplitude high frequency voltage is applied or a great ripple current flows in many cases. An example of such a capacitor used in a switching power supply is a so-called metalized film capacitor obtained by depositing aluminum or the like on an organic film. A dielectric such as a polyethylene terephthalate film used in this capacitor is excellent in a high frequency property and is stable for high electric field strength. However, the dielectric has a low dielectric constant and a small capacity obtained per unit volume, resulting in a large size inevitably. In addition, the dielectric is difficult to be considered as a low-loss dielectric due to high equivalent series inductance and high equivalent series resistance. Furthermore, since a resin film is used as a base in this capacitor, thermal resistance also has been a matter to be considered.

In order to improve the thermal resistance, it is conceivable to use a multilayer ceramic capacitor formed by laminating dielectric ceramics and electrode metals alternately. The conventional technique of a multilayer ceramic capacitor will be explained roughly.

When considering static capacitance obtained in view of a configuration of a multilayer capacity, the static capacitance increases in proportion to an electrode surface area and the number of laminated layers and in inverse proportion to the thickness of one dielectric layer. The dielectric layer cannot be reduced in thickness excessively when considering its reliability. Therefore, when producing a large-capacity multilayer capacitor, the whole electrode surface area (the product obtained by multiplying an area of one layer by the number of laminated layers) must be increased.

On the other hand, the electrode metal is selected depending on the temperature at which a dielectric is sintered and atmosphere conditions. In other words, when a dielectric must be baked at a temperature of at least 1150° C. in an air atmosphere, palladium or an alloy containing palladium as the main component is selected so that the electrodes are not melted and oxidized. In this case, however, since palladium is expensive, a capacitor with electrodes having a large total area also becomes expensive. When using a dielectric that can be sintered at a temperature of at least 1150° C. in a reducing atmosphere, nickel electrodes can be used, which is favorable in cost. However, materials that are not decreased in dielectric properties, particularly insulation resistance even after being baked in the reducing atmosphere are limited and a high dielectric constant is difficult to obtain. When the firing temperature is below 1150° C., an alloy containing silver as the main component, namely an alloy of silver:palladium=7:3 can be used, which is advantageous in producing a large-capacity multilayer capacitor.

Dielectric ceramic materials used for multilayer ceramic capacitors are roughly divided into two kinds. First materials are paraelectric materials formed of a solid solution containing calcium titanate or strontium titanate as the main component, which are known as materials used for temperature compensation. The paraelectric materials do not have a ferroelectric phase transition point, i.e. a Curie point, even at a low temperature. Second materials are ferroelectric materials containing barium titanate as the main component that are known as materials with a high dielectric constant, or ferroelectric materials called lead-based relaxers containing lead-magnesium niobate or lead-zinc niobate as the main component, which has a Curie point. The ferroelectric materials show the dielectric constant peak at the Curie point. Therefore, when the Curie point is present in the vicinity of room temperature, a higher dielectric constant can be obtained. At a temperature below around the Curie point, dielectric losses (tan δ) increase. In view of the above, materials having a Curie point at a temperature somewhat lower than room temperature are selected in high dielectric materials. The first materials are excellent in high frequency property and stable for a DC bias electric field or a large-amplitude high frequency electric field, and exhibit excellent properties even in a severe electrical environment. However, the dielectric constants of the first materials are no more than 300. Therefore, in producing capacitors with a large capacity, for example, at least 1 $\mu$F that is required in a power circuit, the capacitors are not only increased in size but also in number of laminated layers, resulting in high costs. Consequently, such capacitors have not been put into practical use. On the other hand, the second materials with high dielectric constants have different dielectric constants depending on their temperature characteristics. However, when using materials having a characteristic of a temperature change rate within±10%, which is stipulated as the B-level characteristic in JIS (Japanese Industrial Standard) C6429, a dielectric constant of 2000 to 3000 is obtained. As materials having a characteristic in which the temperature change is allowed between +30% and −80%, which is stipulated as the F-level characteristic, when using barium titanate-based materials and a lead-based relaxer, high dielectric constants of about 10000 and 15000 to 20000 are obtained, respectively. Thus, the second materials are advantageous in producing capacitors with a large capacity and thus have been used practically.

Materials containing $(SrPb)TiO_3$ as a main component have been reported as materials used for high voltage capacitors (Hirotaka YAMAMOTO et al., Nihon Ceramics Kyokai Gakujutsu Ronbunshi (Journal of the Ceramic Society of Japan), Vol. 97, No. 6, pages 619–622, 1989, and Publication of Unexamined Japanese Patent Application (Tokkai Sho) No. 60-189107). These reports describe that the materials have a high dielectric constant of 2800 and are not greatly changed in static capacity for a DC bias voltage.

Figure 1:
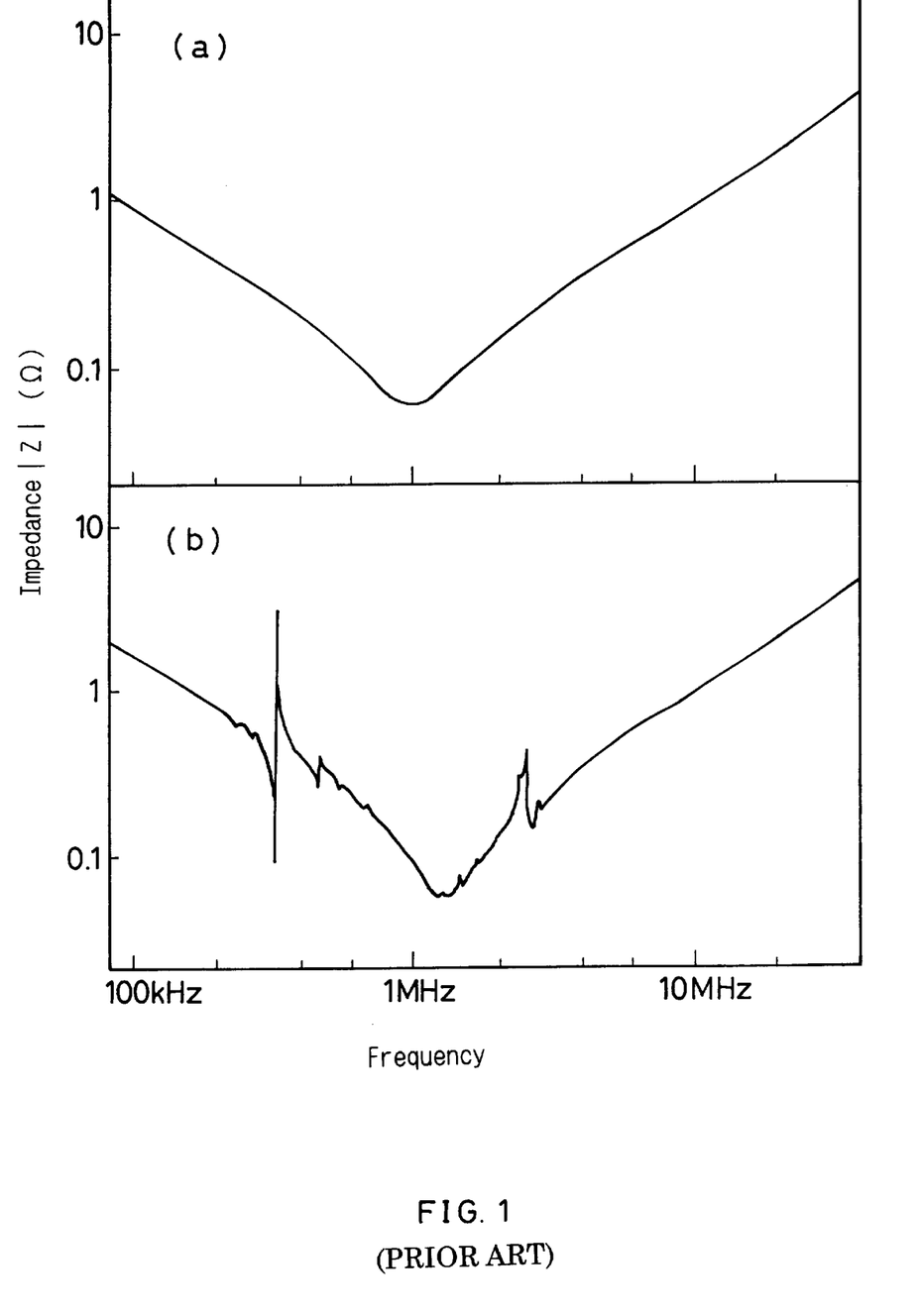

However, when a DC bias voltage is applied to a material with a high dielectric constant, piezoelectricity is induced and thus mechanical vibration is induced by a superimposed high frequency electric field through electromechanical coupling. For instance, when the material is used for an input or output capacitor in a switching power supply and the vibration resonates at the switching frequency, an unwanted ripple current flows, thus increasing loss energy in the capacitor, which contributes to temperature rise. As an experiment, a multilayer capacitor that was formed of dielectrics represented by a formula, $Pb_{0.94}Sr_{0.05}(Mg_{1/3}Nb_{2/3})_{0.49}(Zn_{1/3}Nb_{2/3})_{0.21}Ti_{0.215}(Ni_{1/2}W_{1/2})_{0.0425}O_3$, that were lead-based relaxers and electrodes made of a silver-palladium alloy was produced, and was used in the above-mentioned circuit. The capacitor had an outer size of 5×6×1.6 mm, an electrode surface area per layer was 20 mm$^2$, the number of effective layers was 20, and one dielectric layer had a thickness of 23 μm. In this capacitor, the fluctuation in frequency of the impedance was checked under the application of no DC bias voltage. As shown in FIG. 1(a), LC resonance was found in the vicinity of 1 MHz, but no resonance was found at other frequencies. However, when a DC bias voltage of 40 V was applied to the capacitor, as shown in FIG. 1(b), unwanted resonances were observed in the vicinity of 300 kHz and 2 MHz. It was proved that vibrations in an inplane direction and in a thickness direction were excited due to piezoelectricity induced by the DC bias voltage, which resonated at frequencies determined by the sizes in length and width and the size in thickness of the capacitor, thus causing the unwanted resonances. Even when a DC bias voltage of about 5 V was applied, the above-mentioned unwanted resonances still occurred, although they became weak.

In materials with high dielectric constants, the increase in dielectric loss depending on high frequency electric field strength cannot be avoided. For instance, in the above-mentioned capacitor, a value of tan δ was about 0.5% when being measured with a signal of 0.01 V and 1 kHz. However, when being measured with a signal of 10 V and 1 kHz, the value of tan δ increased to 1.2%. When a 0.22 μF multilayer capacitor to which commercially available barium titanate dielectrics were applied, which was employed as a capacitor having the B-level characteristic described above, was measured with a signal of 1 kHz, the value of tan δ was 0.75% at 0.01 V but increased to 3.5% by the application of a voltage of 15 V. In this capacitor, a dielectric had a thickness of 55 μm. Usually, a switching power supply operates at frequencies of at least several tens to several hundreds kHz. In this case, the increase of tan δ depending on the high frequency electric field strength increases the loss in the circuit.

In addition, materials containing (SrPb)TiO$_3$ as a main component have a high firing temperature of 1220° C. and therefore cannot be used for obtaining an inexpensive multilayer capacitor.

SUMMARY OF THE INVENTION

The present invention seeks to solve the above-mentioned conventional problems. It is an object of the present invention to provide an inexpensive large-capacity multilayer capacitor that has thermal resistance, is stable for a high DC bias voltage and a large-amplitude high frequency voltage, and is used in a switching power supply or the like, and a low loss switching power supply using this capacitor.

In order to attain the aforementioned object, a multilayer ceramic capacitor of the present invention is formed by laminating electrode metal layers and dielectric ceramic layers alternately and has its static capacitance peak at a temperature below −50° C. The multilayer ceramic capacitor is at least one selected from a multilayer ceramic capacitor to be incorporated into an electric circuit in which an electric field of at least 200 V/mm is applied to dielectric layers as a DC bias electric field and an alternating current at a frequency of at least 20 kHz is superimposed and a multilayer ceramic capacitor to be incorporated into an electric circuit in which an electric field of at least 200 V/mm is applied to dielectric layers as an AC electric field.

In the above-mentioned capacitor of the present invention, it is preferable that dielectric ceramic contains lead atoms whose amount is indicated by being measured in the form of PbO, which is at least 30 mol %.

In the above-mentioned capacitor of the present invention, it is preferable that the dielectric ceramic containing lead atoms whose amount is indicated by being measured in the form of PbO, which is at least 30 mol %, is a compound with a perovskite structure represented by a formula ABO$_3$, wherein an element at the A site is Pb or Pb and at least one kind of alkaline earth element, and an element at the B site is at least one kind of element selected from the group including Mg, Zn, Ni, and Co and at least one kind of element selected from the group including Nb, Ta, and W.

In the above-mentioned capacitor of the present invention, it is preferable that the dielectric ceramic further contains at least one kind of element selected from the group including Ti, Zr, and Sn at the B site.

Furthermore, in the above-mentioned capacitor of the present invention, it is preferable that the dielectric ceramic contains manganese atoms whose amount is indicated by being measured in the form of MnO$_2$, which is in a range between 0.01 wt % and 1 wt %.

In the above-mentioned capacitor of the present invention, it is preferable that the electrode metal is silver, an alloy containing silver as a main component, copper, or an alloy containing copper as a main component. The term "a main component" used herein denotes a component contained at a ratio of at least 50% in all the components.

In the above-mentioned capacitor of the present invention, it is preferable that the electric circuit is incorporated into at least one selected from an input filter, an output filter, and a snubber for eliminating surge in a switching power supply.

Moreover, in the above-mentioned capacitor of the present invention, it is preferable that the electric circuit is incorporated into an energy storage unit in a device for generating high voltages by capacitive discharge.

In the above-mentioned capacitor of the present invention, it is preferable that unwanted piezoelectric resonance is hardly observed as frequency characteristics of impedance when a DC bias voltage of at least 200 V/mm is applied to the dielectric ceramic layers.

In the above-mentioned capacitor of the present invention, it is preferable that an electric field applied to the capacitor is at least 200 V/mm.

In the above-mentioned capacitor of the present invention, it is preferable that the dielectric ceramic of the dielectric ceramic layers has a dielectric constant in a range between 1000 and 4000.

As described above, according to the present invention, the temperature at which a dielectric with a perovskite structure containing PbO of at least 30 mol % has its dielectric constant peak, i.e. the Curie temperature is allowed to be below −50° C. Therefore, piezoelectricity is not induced even when a DC bias voltage is applied, thus enabling a multilayer capacitor having no loss caused by excitation of unwanted resonance to be produced using inexpensive electrode metal. As a result, a capacitor with a large capacity used in a power supply can be obtained at a practical price. Consequently, the miniaturization of power circuits and the reliability in thermal resistance can be improved.

BRIEF DESCRIPTION OF THE DRAWINGS

FIGS. 1(a) and (b) show impedance characteristics of a conventional capacitor.

FIGS. 5(a) and (b) show impedance characteristics of a capacitor of an example according to the present invention.

DETAILED DESCRIPTION OF THE INVENTION

An embodiment of the present invention will be described further in detail as follows.

A dielectric containing lead atoms whose amount is indicated by being measured in the form of PbO, which is at least 30 mol %, particularly a ceramic composition made of compounds having a perovskite structure represented by a formula $ABO_3$, is used as a dielectric ceramic for a multi-layer ceramic capacitor of the present invention, and the temperature at which the dielectric has its dielectric constant peak is allowed to be present below −50° C.

Multilayer capacitors comprising dielectric ceramics of various compositions made of compounds having the perovskite structure that are represented by a formula $ABO_3$, in which lead atoms are located at the A site, and internal electrodes made of an alloy of silver:palladium=70:30 were prepared. The characteristics of those capacitors were evaluated by setting a DC bias voltage between 0 V and 40 V and using a measuring signal with a frequency of 1 kHz to 1 MHz and an effective voltage of 0.01 V to 10 V.

In the multilayer capacitors prepared using the various compositions, the dielectric ceramics used therein are divided into three groups of compounds. A first group of compounds that are ferroelectrics with the perovskite structure having a Curie point at a temperature higher than −50° C. includes $Pb(Mg_{1/3}Nb_{2/3})O_3$(−8° C.), $Pb(Zn_{1/3}Nb_{2/3})O_3$ (140° C.), and $PbTiO_3$(490° C.). A second group of compounds having a Curie point below −50° C. includes $Pb(Ni_{1/3}Nb_{2/3})O_3$(−120° C.) and $Pb(Co_{1/3}Nb_{2/3})O_3$(−70° C.). A third group of compounds that decrease the Curie point of the ferroelectrics includes $Pb(Mg_{1/2}W_{1/2})O_3$, $Pb(Co_{1/2}W_{1/2})O_3$, and $Pb(Zn_{1/2}W_{1/2})O_3$. When a composition having a Curie point below −50° C. as a solid solution of compounds of the first group and of the second or third group, or a solid solution of the compounds of the first, second, and third groups was used as the dielectric ceramic, the characteristics in which the dielectric constant was at least 1000 and the value of tan δ was below 0.1% at 1 kHz were obtained. In these capacitors, even when the frequency property of impedance was evaluated by applying a DC bias voltage of 200 to 3000 V/mm to dielectric layers, unwanted resonance was hardly observed. It was confirmed that no piezoelectric resonance induced by the DC bias voltage was caused or, even if any, the piezoelectric resonance was extremely weak, thus causing no problem in practical use. Further, in these capacitors, even if the electric field of the measuring signal was strengthened to a range of 200 to 800 V/mm, the value of tan δ was not increased greatly. Thus, low loss capacitors were obtained.

The compositions of the dielectrics are not limited to the combinations among the above-mentioned first to third groups. Instead of the first group of compounds, a solid solution having a Curie point above −50° C. such as $Pb(TiZr)O_3$, $Pb(TiSn)O_3$, $Pb\{(Mg_{1/3}Nb_{2/3})Ti\}O_3$, and $Pb\{(Mg_{1/3}Ta_{1/2})Ti\}O_3$ may be used. In addition, a solid solution in which its Curie point is lowered by substituting a part of Pb with alkaline-earth metal of Ca, Sr, and/or Ba may be used. Moreover, it was found that the addition of 1 wt % or less of $MnO_2$ was effective for improving insulation resistance of the dielectric ceramic and decreasing the value of tan δ at low frequencies.

Figure 2:
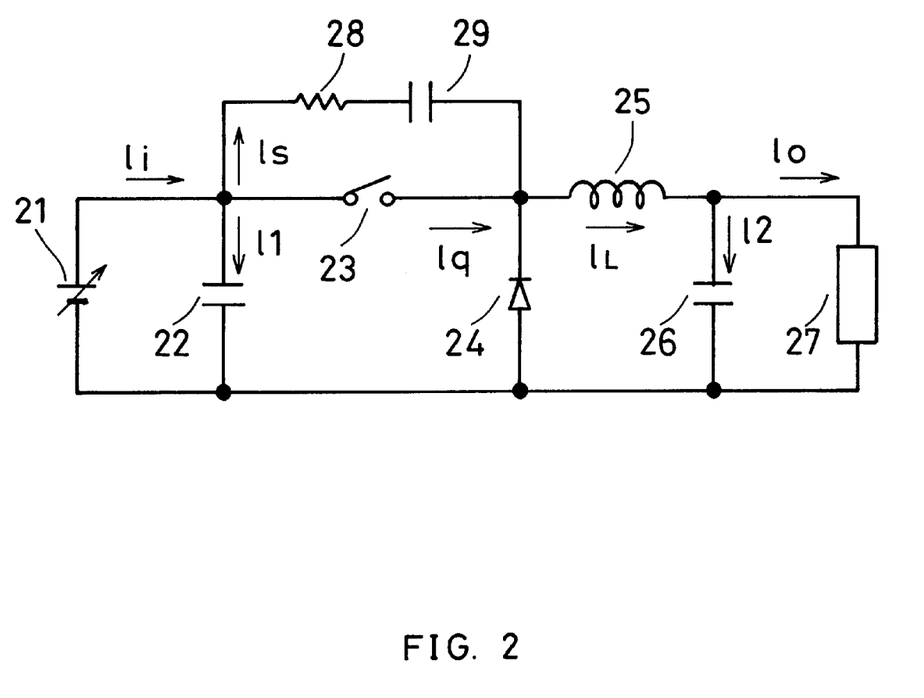
FIG. 2 is a circuit diagram of a switching power supply using a capacitor of an embodiment according to the present invention.
Figure 3:
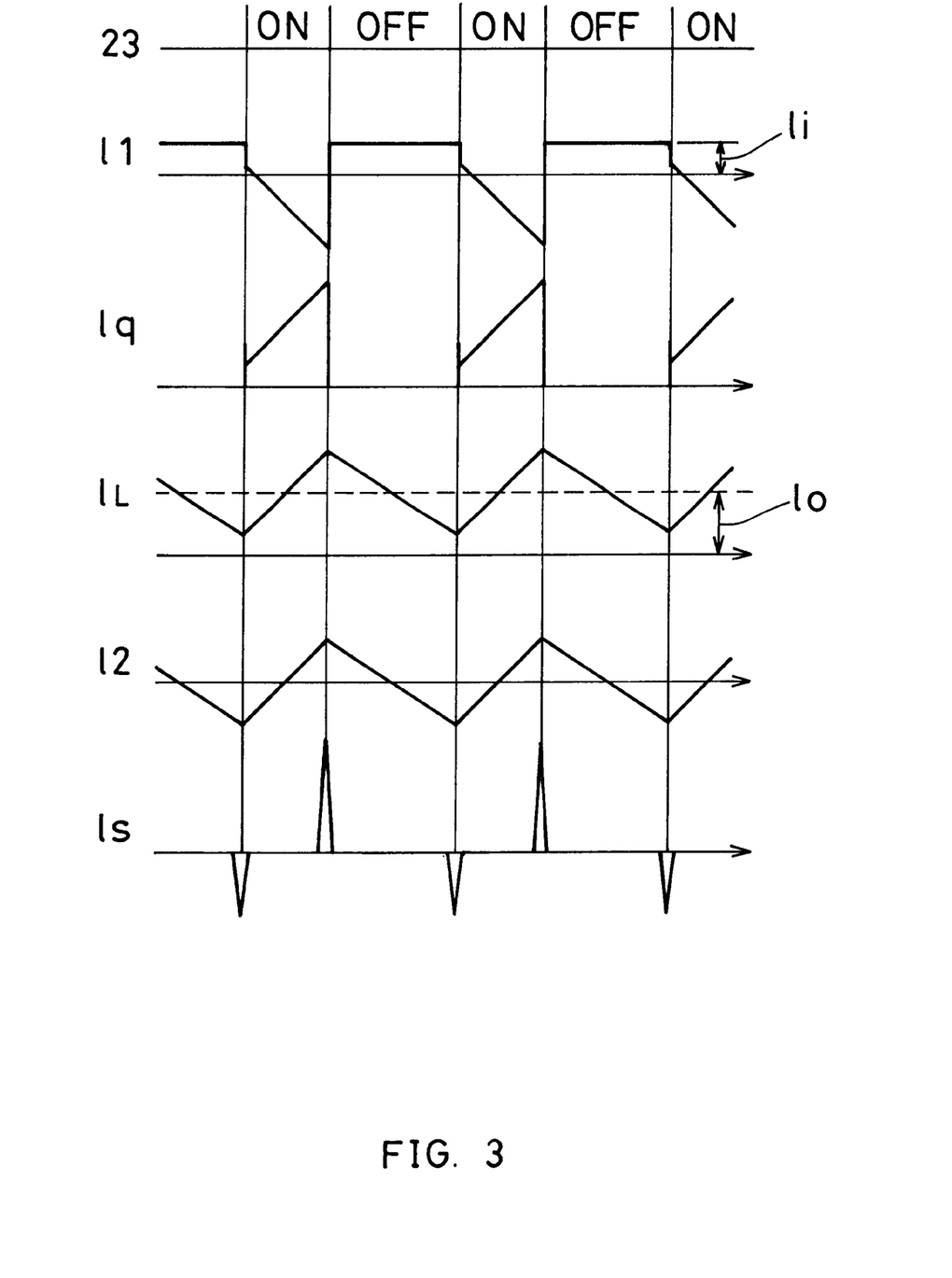
FIG. 3 shows current waveforms at the important parts in FIG. 2.

FIG. 2 shows a circuit diagram of a switching power supply using capacitors of the present invention. FIG. 3 shows current waveforms at the important parts in FIG. 2. This switching power supply is called "a step-down converter". In the switching power supply, electric energy input from a DC power source 21 is smoothed by an input capacitor 22, then is converted to an alternating current by repeatedly turning a switching element 23 on and off, and is rectified and smoothed by a diode 24, a choke 25, and an output capacitor 26. The output voltage output into a load circuit 27 is adjusted according to the ratio of time in the on state to time in the off state (the on-off ratio) of the switching element 23. This switching power supply monitors output voltages and has a function for adjusting the on-off ratio so as to stabilize the output voltages, which is not shown in the figure. A series circuit of a resistor 28 and a capacitor 29 is connected to both ends of the switching element 23 and suppresses the generation of a surge voltage in switching. The capacitor of the embodiment according to the present invention can be used as at least one of the input capacitor 22, the output capacitor 26 and a snubber capacitor 29. For instance, under the conditions of a switching frequency of 300 kHz, an input DC voltage of 36 V to 72 V, and an output DC voltage of 10 V, a maximum of 72 V DC bias voltage is applied to the both ends of the input capacitor 22 and the snubber capacitor 29 and a 10 V DC bias voltage is applied to the both ends of the output capacitor 26, and a high-frequency ripple current as shown in FIG. 3 flows in the respective capacitors. In other words, a high-frequency electric field of 300 kHz is superimposed. If piezoelectric vibration occurs in the vicinity of 300 kHz in the capacitors, it resonates at a switching frequency and an unwanted resonance current flows inside the capacitors, thus increasing the ripple voltage and loss. As a result, the capacitors operate as if their static capacitance is considerably decreased apparently. However, in the capacitors of the embodiment according to the present invention, such a phenomenon does not occur. Furthermore, the characteristics of the capacitors in which the static capacitance is not changed greatly by a DC voltage have an effect for facilitating the design of a switching power supply. Generally, it is desired for performance of a power source that an input/output ripple voltage is low. In order to suppress the ripple voltage, large static capacitance of the input and output capacitors, low equivalent series impedance, i.e. a small value of tan δ, and the stability of these characteristics regardless of various conditions are required.

Figure 4:
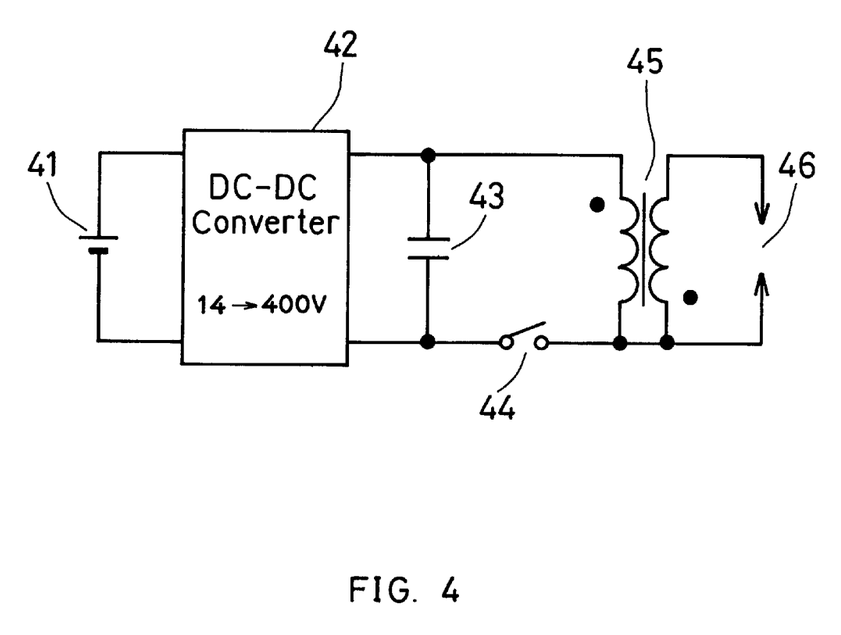
FIG. 4 is a circuit diagram of a device for generating high voltages using a capacitor of the embodiment according to the present invention.

Further, a capacitor of the embodiment according to the present invention was applied to a device for generating high voltages by capacitive discharge used for ignition of an engine. FIG. 4 shows the circuit diagram thereof. A DC input voltage from a battery 41 is converted to a voltage of 400 V in a DC-DC converter 42 and then charges a capacitor 43. Further, by high frequency switching of the switching element 44, a current is discharged to a discharging gap 46 through a coil 45. The switching frequency is about 100 kHz, and a high frequency electric field of 100 kHz and 400 V is applied to the both ends of the capacitor 43. When a conventional capacitor in which the value of tan δ is increased by the application of a DC voltage or a high-frequency voltage is used as the capacitor 43, great losses are caused. Therefore, high energy efficiency is not expected in the conventional capacitor. By using the capacitor of the embodiment according to the present invention, at least 65% of the energy stored in the capacitor can be utilized as discharge energy, thus obtaining a great effect when compared to the efficiency of 40% in a commercially available capacitor with the same capacity that is made of materials containing barium titanate with the B-level characteristic as a main component.

Besides the circuits described above, the capacitor of the present invention having the characteristics in which piezoelectric vibration is not caused by the application of a high frequency electric field and static capacitance is not changed greatly also is useful for a timer circuit for setting a time constant.

EXAMPLE

The present invention will be described further concretely using an example as follows.

Dielectric ceramic raw materials used for multilayer capacitors were prepared as follows. According to the compositions shown in Table 1, high purity (at least 99%) PbO, MgO, ZnO, NiO, CoO, $Nb_2O_5$, $Ta_2O_5$, $WO_3$, $TiO_2$, $ZrO_2$, $SnO_2$, $CaCO_3$, $SrCO_3$, $BaCO_3$, and $MnO_2$ were weighed, were mixed with pure water using stabilized zirconia having an average diameter of 5 mm as a mixed medium in a 500-ml polyethylene container for 17 hours, which was dried, was then put into an alumina crucible, and was calcined at 750° C. for 2 hours. The calcined powder was ground in the above-mentioned container for 17 hours and was dried, thus obtaining raw materials for dielectrics. A polyvinyl alcohol aqueous solution was added to the raw material powder for granulation, which was molded into discs having an average diameter of 13 mm and a thickness of about 1 mm. Then, the discs were baked at 950 to 1100° C. for 1 hour. On both surfaces of the sintered discs obtained, Cr-Au electrodes were deposited. Then, static capacitance and temperature change were measured, thus obtaining dielectric constants and Curie points of the materials. The measurement result is shown in Tables 1 and 2. In this case, the measurement at a temperature below −70° C. was not carried out.

Next, a production method and an evaluation method for multilayer capacitors using those raw materials will be described. To the raw material powder, 5 to 10 wt % of polyvinyl butyral as a binder and 2 to 5 wt % of butylbenzylphthalate as a plasticizer were added, which was mixed with a solvent, thus obtaining a slurry. Using the slurry obtained, a sheet with a thickness of 20 to 40 μm was formed on a polyethylene terephthalate film by a doctor blade method to obtain a green sheet. This green sheet was cut and 3 to 10 green sheets from which the polyethylene terephthalate film had been peeled off were laminated on a metal plate under the application of pressure. On this laminated body, a Ag/Pd electrode paste was printed and dried, and then one green sheet was placed and laminated thereon under the application of pressure. As a next step, an electrode paste was printed with its electrode pattern being shifted from the position where the previous electrode pattern had been printed so that electrodes having different patterns at every other layer can be lead out alternately. After the printing and lamination processes were repeated to obtain the required number of layers, 3 to 10 green sheets alone were laminated. The laminated body was cut and separated to individual capacitors and the binder was incinerated by increasing the temperature to 600° C. at 50° C./hour. Then, the capacitors were put into a magnesia container and were baked at 950 to 1100° C. for one hour. In order to connect internal electrodes in the baked capacitors, a silver paste was applied thereon and fired at 600° C. for 15 minutes to obtain external electrodes. In the capacitors, an effective portion of an electrode had a length of 5 mm and a width of 4.2 mm. The thickness of a dielectric and the number of laminated layers are shown in Table 2.

TABLE 1

| No. | Composition | Temperature Change Rate % | | Dielectric Constant |
|---|---|---|---|---|
| | | −25° C. | 85° C. | |
| Comparative Example 1 | $BaTiO_3$-based Composition with B-Level Characteristics | −4 | −8 | 2200 |
| Comparative Example 2 | $BaTiO_3$-based Composition with F-Level Characteristics | −17 | −75 | 8000 |
| Comparative Example 3 | $Pb(Mg_{1/3}Nb_{2/3})_{0.7}Ti_{0.19}(Ni_{1/2}W_{1/2})_{0.11}O_3$ + 0.1 wt % $MnO_2$ | −49 | −44 | 16000 |
| Comparative Example 4 | $Pb(Mg_{1/3}Nb_{2/3})_{0.7}Ti_{0.15}(Ni_{1/2}W_{1/2})_{0.15}O_3$ | +48 | −49 | 8000 |
| Comparative Example 5 | $Pb_{0.94}Sr_{0.05}(Mg_{1/3}Nb_{2/3})_{0.49}(Zn_{1/3}Nb_{2/3})_{0.21}Ti_{0.215}(Ni_{1/2}W_{1/2})_{0.0425}O_3$ | −7 | −53 | 11200 |
| Comparative Example 6 | $Pb(Mg_{1/3}Nb_{2/3})_{0.8}(Zn_{1/3}Nb_{2/3})_{0.1}(Ni_{1/2}W_{1/2})_{0.1}O_3$ | +55 | −43 | 2950 |
| 1 | $Pb(Mg_{1/3}Nb_{2/3})_{0.9}(Ni_{1/2}W_{1/2})_{0.1}O_3$ + 0.1 wt % $MnO_2$ | +46 | −42 | 3600 |
| 2 | $Pb(Mg_{1/3}Nb_{2/3})_{0.8}(Ni_{1/2}W_{1/2})_{0.2}O_3$ + 0.05 wt % $MnO_2$ | +41 | −35 | 1940 |
| 3 | $Pb(Mg_{1/3}Nb_{2/3})_{0.7}(Ni_{1/2}W_{1/2})_{0.3}O_3$ + 0.1 wt % $MnO_2$ | +35 | −31 | 1200 |
| 4 | $Pb(Mg_{1/3}Nb_{2/3})_{0.3}(Zn_{1/3}Nb_{2/3})_{0.5}(Ni_{1/2}W_{1/2})_{0.2}O_3$ + 0.05 wt % $MnO_2$ | +31 | −34 | 2840 |
| 5 | $Pb(Mg_{1/3}Nb_{2/3})_{0.4}(Zn_{1/3}Nb_{2/3})_{0.3}(Ni_{1/2}W_{1/2})_{0.3}O_3$ + 0.05 wt % $MnO_2$ | +32 | −31 | 1590 |
| 6 | $Pb(Mg_{1/3}Nb_{2/3})_{0.2}(Zn_{1/3}Nb_{2/3})_{0.4}(Ni_{1/2}W_{1/2})_{0.4}O_3$ + 0.05 wt % $MnO_2$ | +31 | −28 | 1130 |

TABLE 1-continued

| No. | Composition | Temperature Change Rate % −25° C. | Temperature Change Rate % 85° C. | Dielectric Constant |
|---|---|---|---|---|
| 7 | $Pb(Mg_{1/3}Nb_{2/3})_{0.7}Ti_{0.1}(Ni_{1/2}W_{1/2})_{0.2}O_3$ | +53 | −44 | 3810 |
| 8 | $Pb(Mg_{1/3}Nb_{2/3})_{0.7}(Mg_{1/3}Ta_{2/3})_{0.1}(Ni_{1/2}W_{1/2})_{0.2}O_3$ | +38 | −34 | 1530 |
| 9 | $Pb(Mg_{1/3}Nb_{2/3})_{0.7}(Ni_{1/3}Nb_{2/3})_{0.1}(Ni_{1/2}W_{1/2})_{0.2}O_3$ | +38 | −35 | 1360 |
| 10 | $Pb(Mg_{1/3}Nb_{2/3})_{0.7}(Co_{1/3}Nb_{2/3})_{0.1}(Ni_{1/2}W_{1/2})_{0.2}O_3$ | +36 | −33 | 1220 |
| 11 | $Pb(Mg_{1/3}Nb_{2/3})_{0.8}(Zn_{1/2}W_{1/2})_{0.2}O_3$ | +38 | −32 | 1860 |
| 12 | $Pb(Mg_{1/3}Nb_{2/3})_{0.7}Zr_{0.1}(Ni_{1/2}W_{1/2})_{0.2}O_3$ | +51 | −42 | 2830 |
| 13 | $Pb(Mg_{1/3}Nb_{2/3})_{0.7}Sn_{0.1}(Ni_{1/2}W_{1/2})_{0.2}O_3$ | +48 | −38 | 2450 |
| 14 | $Pb(Mg_{1/3}Nb_{2/3})_{0.7}Ti_{0.1}(Ni_{1/2}W_{1/2})_{0.15}(Mg_{1/2}W_{1/2})_{0.05}O_3$ | +50 | −42 | 3670 |
| 15 | $Pb(Mg_{1/3}Nb_{2/3})_{0.7}Ti_{0.1}(Ni_{1/2}W_{1/2})_{0.15}(Co_{1/2}W_{1/2})_{0.05}O_3$ | +51 | −42 | 3610 |
| 16 | $Pb_{0.95}Ca_{0.05}(Mg_{1/3}Nb_{2/3})_{0.8}(Ni_{1/2}W_{1/2})_{0.2}O_3$ | +38 | −33 | 1320 |
| 17 | $Pb_{0.95}Sr_{0.05}(Mg_{1/3}Nb_{2/3})_{0.8}(Ni_{1/2}W_{1/2})_{0.2}O_3$ | +38 | −35 | 1530 |
| 18 | $Pb_{0.95}Ba_{0.05}(mg_{1/3}Nb_{2/3})_{0.8}(Ni_{1/2}W_{1/2})_{0.2}O_3$ | +40 | −37 | 1680 |

TABLE 2

| No. | Composition | Thickness μm | Number of Laminated Layers | Curie Point ° C. |
|---|---|---|---|---|
| Comparative Example 1 | $BaTiO_3$-based Composition with B-Level Characteristics | 55 | 35 | 125 |
| Comparative Example 2 | $BaTiO_3$-based Composition with F-Level | 50 | 85 | 0 |
| Comparative Example 3 | $Pb(Mg_{1/3}Nb_{2/3})_{0.7}Ti_{0.19}(Ni_{1/2}W_{1/2})_{0.11}O_3$ + 0.1 wt % $MnO_2$ | 40 | 10 | 0 |
| Comparative Example 4 | $Pb(Mg_{1/3}Nb_{2/3})_{0.7}Ti_{0.15}(Ni_{1/2}W_{1/2})_{0.15}O_3$ | 15 | 20 | −30 |
| Comparative Example 5 | $Pb_{0.94}Sr_{0.05}(Mg_{1/3}Nb_{2/3})_{0.49}(Zn_{1/3}Nb_{2/3})_{0.21}Ti_{0.215}(Ni_{1/2}W_{1/2})_{0.0425}O_3$ | 23 | 20 | −8 |
| Comparative Example 6 | $Pb(Mg_{1/3}Nb_{2/3})_{0.8}(Zn_{1/3}Nb_{2/3})_{0.1}(Ni_{1/2}W_{1/2})_{0.1}O_3$ | 18 | 20 | −42 |
| 1 | $Pb(Mg_{1/3}Nb_{2/3})_{0.9}(Ni_{1/2}W_{1/2})_{0.1}O_3$ + 0.1 wt % $MnO_2$ | 13 | 40 | −53 |
| 2 | $Pb(Mg_{1/3}Nb_{2/3})_{0.8}(Ni_{1/2}W_{1/2})_{0.2}O_3$ + 0.05 wt % $MnO_2$ | 21 | 20 | <−70 |
| 3 | $Pb(Mg_{1/3}Nb_{2/3})_{0.7}(Ni_{1/2}W_{1/2})_{0.2}O_3$ + 0.05 wt % $MnO_2$ | 21 | 20 | <−70 |
| 4 | $Pb(Mg_{1/3}Nb_{2/3})_{0.3}(Zn_{1/3}Nb_{2/3})_{0.5}(Ni_{1/2}W_{1/2})_{0.2}O_3$ + 0.05 wt % $MnO_2$ | 20 | 40 | −58 |
| 5 | $Pb(Mg_{1/3}Nb_{2/3})_{0.4}(Zn_{1/3}Nb_{2/3})_{0.3}(Ni_{1/2}W_{1/2})_{0.3}O_3$ + 0.05 wt % $MnO_2$ | 25 | 20 | <−70 |
| 6 | $Pb(Mg_{1/3}Nb_{2/3})_{0.2}(Zn_{1/3}Nb_{2/3})_{0.4}(Ni_{1/2}W_{1/2})_{0.4}O_3$ + 0.05 wt % $MnO_2$ | 24 | 20 | <−70 |
| 7 | $Pb(Mg_{1/3}Nb_{2/3})_{0.7}Ti_{0.1}(Ni_{1/2}W_{1/2})_{0.2}O_3$ | 24 | 20 | −62 |
| 8 | $Pb(Mg_{1/3}Nb_{2/3})_{0.7}(Mg_{1/3}Ta_{2/3})_{0.1}(Ni_{1/2}W_{1/2})_{0.2}O_3$ | 23 | 20 | <−70 |
| 9 | $Pb(Mg_{1/3}Nb_{2/3})_{0.7}(Ni_{1/3}Nb_{2/3})_{0.1}(Ni_{1/2}W_{1/2})_{0.2}O_3$ | 24 | 20 | <−70 |
| 10 | $Pb(Mg_{1/3}Nb_{2/3})_{0.7}(Co_{1/3}Nb_{2/3})_{0.1}(Ni_{1/2}W_{1/2})_{0.2}O_3$ | 23 | 20 | <−70 |
| 11 | $Pb(Mg_{1/3}Nb_{2/3})_{0.7}(Zn_{1/2}W_{1/2})_{0.2}O_3$ | 20 | 20 | <−70 |
| 12 | $Pb(Mg_{1/3}Nb_{2/3})_{0.7}Zr_{0.1}(Ni_{1/2}W_{1/2})_{0.2}O_3$ | 18 | 20 | <−70 |
| 13 | $Pb(Mg_{1/3}Nb_{2/3})_{0.7}Sn_{0.1}(Ni_{1/2}W_{1/2})_{0.2}O_3$ | 23 | 20 | <−70 |
| 14 | $Pb(Mg_{1/3}Nb_{2/3})_{0.7}Ti_{0.1}(Ni_{1/2}W_{1/2})_{0.15}(Mg_{1/2}W_{1/2})_{0.05}O_3$ | 24 | 20 | −58 |
| 15 | $Pb(Mg_{1/3}Nb_{2/3})_{0.7}Ti_{0.1}(Ni_{1/2}W_{1/2})_{0.15}(Co_{1/2}W_{1/2})_{0.05}O_3$ | 24 | 20 | −62 |
| 16 | $Pb_{0.95}Ca_{0.05}(Mg_{1/3}Nb_{2/3})_{0.8}(Ni_{1/2}W_{1/2})_{0.2}O_3$ | 22 | 40 | <−70 |
| 17 | $Pb_{0.95}Sr_{0.95}(Mg_{1/3}Nb_{2/3})_{0.8}(Ni_{1/2}W_{1/2})_{0.2}O_3$ | 22 | 40 | <−70 |
| 18 | $Pb_{0.95}Ba_{0.05}(Mg_{1/3}Nb_{2/3})_{0.8}(Ni_{1/2}W_{1/2})_{0.2}O_3$ | 18 | 40 | <−70 |

The characteristics of the capacitors were evaluated by a LCR meter. Table 3 shows capacities and values of tan δ when signal voltages of 1 khz and 1 Mhz at 0.01 Vrms. were applied. Table 3 also shows capacities and values of tan δ when a signal voltage of 1 kHz and 0.01 Vrms. was superimposed to a DC bias voltage of 40 V and when a signal voltage of 1 kHz and 10 Vrms. was applied. In a comparative example 1, as a $BaTiO_3$ based composition, a commercially available capacitor with the B-level characteristic was used. In the capacitor, the effective area of an electrode had a length of 4 mm and a width of 4.5 mm. By using an impedance analyzer, a DC voltage of 40 V was applied as a bias voltage and the frequency was swept in the range of 1 kHz to 40 MHz, thus measuring the change in impedance to check whether unwanted resonance occurred. In Table 3, one in which unwanted resonance was clearly observed was indicated with x, one in which no unwanted resonance was observed with ○, and one in which unwanted resonance was observed slightly but caused no problem in practical use with Δ.

TABLE 3

| No. | 1 kHz 0.01 Vrms. | | 1 MHz 0.01 Vrms. | | 40 V bias 1 kHz 0.01 Vrms. | | | 1 kHz 10 Vrms. | |
|---|---|---|---|---|---|---|---|---|---|
| | Capacity μF | tan δ % | Capacity μF | tan δ % | Capacity μF | tan δ % | Unwanted Resonance | Capacity μF | tan δ % |
| Comparative Example 1 | 0.221 | 0.75 | 0.220 | 3.2 | 0.233 | 0.8 | × | 0.242 | 2.7 |
| Comparative Example 2 | 2.20 | 0.22 | 2.52 | 7.1 | 1.21 | 1.1 | × | 2.74 | 3.7 |
| Comparative Example 3 | 0.753 | 0.5 | 0.572 | 24.4 | 0.448 | 0.4 | × | 0.807 | 1.2 |
| Comparative Example 4 | 2.02 | 0.2 | 1.82 | 5.2 | 1.39 | 0.15 | × | 2.24 | 0.65 |
| Comparative Example 5 | 1.73 | 0.44 | 1.28 | 54.6 | 0.904 | 0.17 | × | 1.75 | 0.97 |
| Comparative Example 6 | 0.503 | 0.12 | 0.494 | 8.4 | 0.453 | 0.11 | × | 0.507 | 0.18 |
| 1 | 1.70 | 0.02 | 1.75 | 6.5 | 1.34 | 2.4 | Δ | 1.71 | 0.05 |
| 2 | 0.286 | 0.002 | 0.303 | 3.8 | 0.280 | 0.002 | ○ | 0.287 | 0.004 |
| 3 | 0.165 | 0.002 | 0.161 | 1.3 | 0.159 | 0.002 | ○ | 0.163 | 0.002 |
| 4 | 1.02 | 0.05 | 0.946 | 8.3 | 0.926 | 0.11 | ○ | 1.013 | 0.100 |
| 5 | 0.211 | 0.005 | 0.211 | 1.9 | 0.210 | 0.004 | ○ | 0.211 | 0.006 |
| 6 | 0.141 | 0.002 | 0.141 | 1.11 | 0.143 | 0.007 | ○ | 0.141 | 0.005 |
| 7 | 0.488 | 0.03 | 0.506 | 7.4 | 0.365 | 0.03 | ○ | 0.489 | 0.06 |
| 8 | 0.205 | 0.04 | 0.201 | 7.7 | 0.193 | 0.04 | ○ | 0.206 | 0.07 |
| 9 | 0.174 | 0.01 | 0.168 | 2.3 | 0.166 | 0.008 | ○ | 0.178 | 0.02 |
| 10 | 0.163 | 0.008 | 0.160 | 2.8 | 0.157 | 0.007 | ○ | 0.166 | 0.01 |
| 11 | 0.286 | 0.03 | 0.282 | 8.2 | 0.275 | 0.02 | ○ | 0.191 | 0.07 |
| 12 | 0.483 | 0.02 | 0.478 | 6.7 | 0.454 | 0.02 | ○ | 0.485 | 0.04 |
| 13 | 0.325 | 0.02 | 0.316 | 5.4 | 0.303 | 0.01 | ○ | 0.328 | 0.05 |
| 14 | 0.471 | 0.03 | 0.483 | 7.2 | 0.355 | 0.03 | ○ | 0.471 | 0.05 |
| 15 | 0.460 | 0.02 | 0.478 | 6.9 | 0.343 | 0.02 | ○ | 0.462 | 0.04 |
| 16 | 0.365 | 0.002 | 0.364 | 3.6 | 0.360 | 0.002 | ○ | 0.366 | 0.004 |
| 17 | 0.472 | 0.004 | 0.473 | 4.2 | 0.466 | 0.003 | ○ | 0.477 | 0.007 |
| 18 | 0.571 | 0.004 | 0.575 | 5.6 | 0.565 | 0.004 | ○ | 0.574 | 0.010 |

Figure 5:
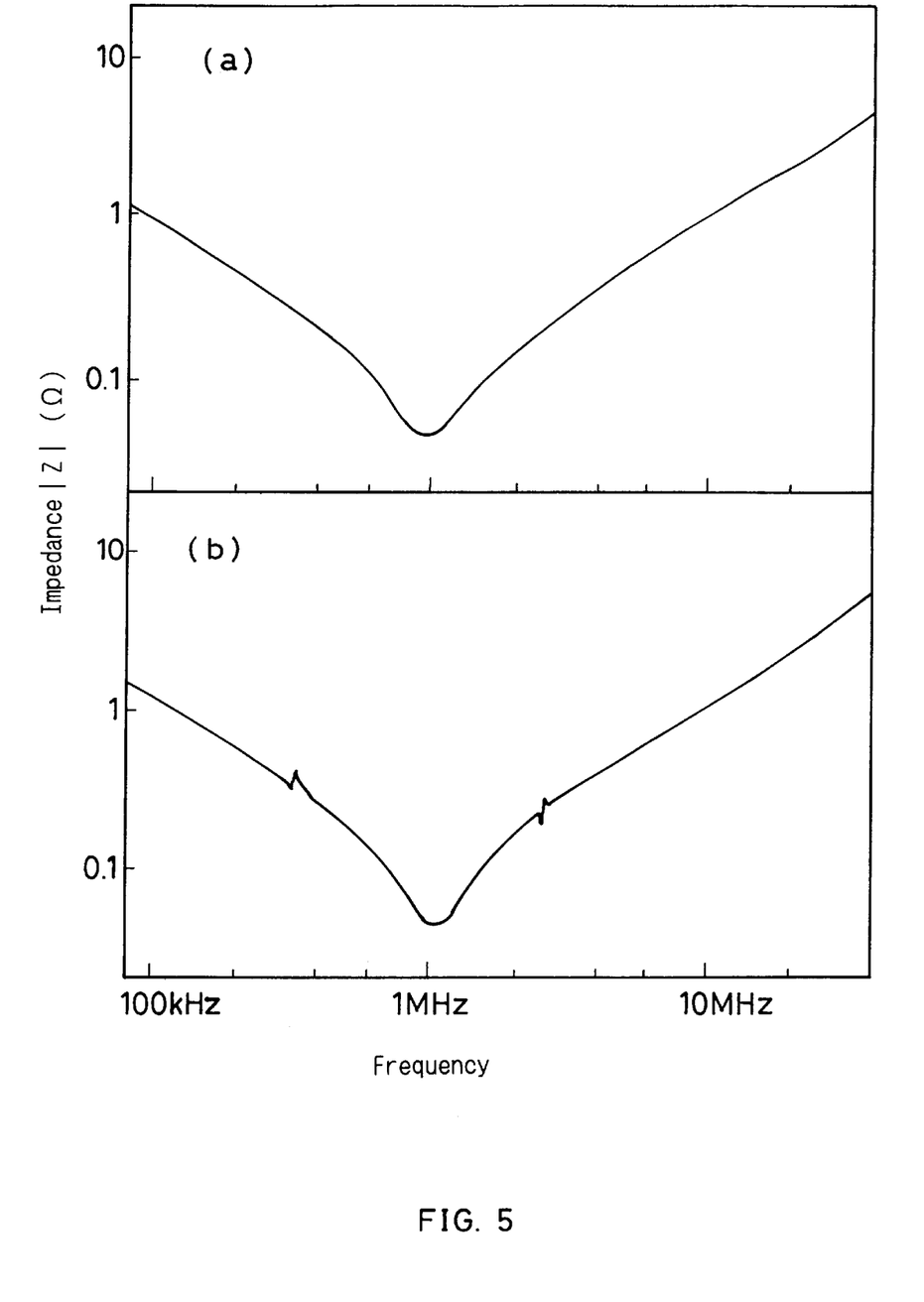

FIG. 5 shows frequency characteristics of impedance in sample No. 1 in which resonance was observed most obviously among the capacitors. FIG. 5(a) shows the characteristics when a DC bias voltage was not applied and FIG. 5(b) when a bias voltage of 40 V was applied. As is apparent from FIG. 5, even when a DC bias electric field of about 3000 V/mm was applied, the piezoelectric resonance was extremely weak. Such weak resonance did not cause any problem in practical use as a switching power supply.

Any of the comparative examples 1–6 shown in Tables 1–3 has a Curie point above −50° C. Therefore, when a DC bias voltage was applied, unwanted resonance was observed. Thus, it is found that the comparative examples are not preferred as capacitors with a large capacity used in a power supply. Further, in the capacitors of comparative examples 1–6, the value of tan δ was increased greatly when a signal voltage of 10 Vrms was applied. Thus, it is found that the use of the capacitors under the application of a high AC signal voltage is not preferred. In any of the capacitors of comparative examples 2, 3, and 4, its capacity was decreased greatly when a bias voltage was applied. Therefore, a capacitor with a greater capacity is necessary for the use under the application of a bias voltage.

On the contrary to the capacitors of comparative examples, in the capacitors of the present example, no unwanted resonance was observed, or even when unwanted resonance was observed by the application of a bias voltage, it was within the range that caused no problem in practical use. In addition, many of the capacitors of the present example had a small value of tan δ at 1 MHz and the value of tan δ was increased only slightly even when a high AC signal voltage was applied. In other words, it was confirmed that the capacitors of the present example showed excellent characteristics as capacitors used in a switching power supply in which a DC voltage was applied or a high frequency ripple current flew, or a circuit for generating high voltages used at high frequencies and high voltages.

Besides the compositions indicated in Table 1 used in the example, when dielectric compositions that can be baked at a temperature below 1150° C. and have a Curie point below −50° C. are used, inexpensive multilayer capacitors can be obtained in which the loss is not increased extremely by the application of a DC bias voltage or a large-amplitude alternating current.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A multilayer ceramic capacitor comprising electrode metal layers and dielectric ceramic layers that are laminated alternately and having a static capacitance peak at a temperature below −50° C., wherein the multilayer ceramic capacitor is at least one selected from a multilayer ceramic capacitor to be incorporated into an electric circuit in which an electric field of at least 200 V/mm is applied to dielectric layers as a DC bias electric field and an alternating current at a frequency of at least 20 kHz is superimposed and a multilayer ceramic capacitor to be incorporated into an electric circuit in which an electric field of at least 200 V/mm is applied to dielectric layers as an AC electric field at a frequency of at least 20 kHz.

2. The multilayer ceramic capacitor according to claim 1, wherein the dielectric ceramic of the dielectric ceramic layers contains lead atoms whose amount is indicated by being measured in the form of PbO, which is at least 30 mol %.

3. The multilayer ceramic capacitor according to claim 2, wherein the dielectric ceramic of the dielectric ceramic layers contains manganese atoms whose amount is indicated by being measured in the form of $MnO_2$, which is in a range between 0.01 wt % and 1 wt %.

4. The multilayer ceramic capacitor according to claim 2, wherein metal of the electrode metal layers is silver, an alloy containing silver as a main component, copper, an alloy containing copper as a main component.

5. The multilayer ceramic capacitor according to claim 2, wherein the dielectric ceramic containing lead atoms whose amount is indicated by being measured in the form of PbO, which is at least 30 mol %, is a compound with a perovskite structure represented by a formula $ABO_3$, wherein an element at the A site is formed of a) Pb or b) Pb and at least one kind of alkaline earth element, and an element at the B site is formed of at least one kind of element selected from the group including Mg, Zn, Ni, and Co and at least one kind of element selected from the group including Nb, Ta, and W.

6. The multilayer ceramic capacitor according to claim 5, wherein the dielectric ceramic contains manganese atoms whose amount is indicated by being measured in the form of $MnO_2$, which is in a range between 0.01 wt % and 1 wt %.

7. The multilayer ceramic capacitor according to claim 5, wherein the dielectric ceramic further contains at least one kind of element selected from the group including Ti, Zr, and Sn at the B site.

8. The multilayer ceramic capacitor according to claim 7, wherein the dielectric ceramic contains manganese atoms whose amount is indicated by being measured in the form of $MnO_2$, which is in a range between 0.01 wt % and 1 wt %.

9. The multilayer ceramic capacitor according to claim 7, wherein the electrode metal is silver, an alloy containing silver as a main component, copper, or an alloy containing copper as a main component.

10. An electric circuit comprising the multilayer ceramic capacitor according to claim 1, wherein the electric circuit is incorporated into at least one selected from an input filter, an output filter, and a snubber for eliminating surge in a switching power supply.

11. An electric circuit comprising the multilayer ceramic capacitor according to claim 1, wherein the electric circuit is incorporated into an energy storage unit in a device for generating high voltages by capacitive discharge.

12. The multilayer ceramic capacitor according to claim 1, wherein the dielectric ceramic of the dielectric ceramic layers has a dielectric constant ranging from 1000 to 4000.

* * * * *